(12) United States Patent
Tanacs et al.

(10) Patent No.: US 7,259,762 B2
(45) Date of Patent: Aug. 21, 2007

(54) METHOD AND SYSTEM FOR AUTOMATICALLY TRANSFORMING CT STUDIES TO A COMMON REFERENCE FRAME

(75) Inventors: Attila Tanacs, Zakanyszek (HU); Eors Mate, Szeged (HU); Attila Kuba, Szeged (HU)

(73) Assignee: General Electric Company, Schenectady, NY (US)

( * ) Notice: Subject to any disclaimer, the term of this patent is extended or adjusted under 35 U.S.C. 154(b) by 128 days.

(21) Appl. No.: 11/160,578

(22) Filed: Jun. 29, 2005

(65) Prior Publication Data

US 2007/0002046 A1    Jan. 4, 2007

(51) Int. Cl.
*G06T 15/00*    (2006.01)
(52) U.S. Cl. .................. 345/424; 600/411; 382/128; 324/309
(58) Field of Classification Search .............. 345/419, 345/424; 600/411, 434; 382/128–131; 324/309, 324/318
See application file for complete search history.

(56) References Cited

U.S. PATENT DOCUMENTS

| | | | | |
|---|---|---|---|---|
| 5,531,520 A | 7/1996 | Grimson et al. | ............ | 382/131 |
| 6,266,453 B1 | 7/2001 | Hibbard et al. | ............. | 382/294 |
| 6,539,127 B1 | 3/2003 | Roche et al. | ................ | 382/294 |
| 6,728,424 B1 | 4/2004 | Zhu et al. | .................... | 382/294 |
| 7,072,705 B2* | 7/2006 | Miga et al. | .................. | 600/411 |
| 2004/0097806 A1* | 5/2004 | Hunter et al. | ................ | 600/434 |

FOREIGN PATENT DOCUMENTS

| WO | WO 04053792 | 6/2004 |
|---|---|---|
| WO | WO 04063987 | 7/2004 |

OTHER PUBLICATIONS

Yiqiang Zhan et al.; "Deformable Registration of Male Pelvises in CT Images"; IEEE International Symposium on Biomedical Imaging (ISBI), Arlington, VA; Apr. 15-18, 2004; pp. 1463-1466.
Tanacs, A.; "Evaluation of a Fully Automatic Medical Image Registration Algorithm Based on Mutual Information"; Acta Cybernetical; 2003; vol. 16; pp. 327-336.

* cited by examiner

*Primary Examiner*—Phu K. Nguyen
(74) *Attorney, Agent, or Firm*—Cantor Colburn LLP

(57) ABSTRACT

A method for automatically transforming computed tomography (CT) studies to a common reference frame includes transforming selected CT studies to the common reference frame and generating a statistical atlas via a registration algorithm including a local refinement and establishing voxel-to-voxel correspondence between a CT study to be segmented and the statistical atlas via the registration algorithm including the local refinement.

23 Claims, 9 Drawing Sheets

METHOD AND SYSTEM FOR AUTOMATICALLY TRANSFORMING CT STUDIES TO A COMMON REFERENCE FRAME

BACKGROUND OF THE INVENTION

The present invention relates generally to image systems and, more particularly, to systems and methods for automatically transforming computed tomography (CT) studies of a pelvis region to a common reference frame.

During clinical diagnosis, a patient's internal anatomy is imaged to determine how a disease has progressed. An infected tissue (such as tumor mass) shows some differences from a normal tissue. Also, the patient may have some type of individual differences or abnormalities regarding even healthy tissues.

Several modalities are used to generate images of the patient's internal anatomy or functionality, suitable for diagnostic purposes, radiotherapy treatment, or for surgical planning. Exemplary modalities include conventional X-ray plane film radiography; computed tomography ("CT") imaging, magnetic resonance imaging ("MRI"); and nuclear medicine imaging techniques, such as positron emission tomography ("PET") and single photon emission computed tomography ("SPECT").

In a case of radiation treatment ("RT") planning, CT imaging is generally used because an image pixel gray value (Hounsfield Units) is a direct function of a radiation dose calculation. A CT image is three dimensional (3D), more precisely, the CT image is a collection of adjacent transaxial two dimensional (2D) slices. Clinicians undertake a process of recombining anatomical elements of 2D slices to form a 3D object or an organ to get anatomical data about the patient being treated. The process of recombining anatomical elements as stated above is usually termed a reconstruction.

RT planning typically involves, clinicians such as, for example, radiologists, dosimetrists or radiotherapists, tracing outlines of a few critical structures on a number of image slices. Manually tracing the outlines on a contiguous set of 2D slices and then combining them can be time consuming and labor intensive. Time and labor increase significantly both as the number of image slices increase, and as a number and size of an organ, tumor, etc. in an anatomical area of interest increases. Quality of the outlining and quality of a produced 3D object depend on a resolution and contrast of the 2D slices, and on knowledge and judgment of the clinician performing the reconstruction.

Using an automated image segmentation could save time and labor that would otherwise be needed if using manual tracing. Also, automated image segmentation could increase precision (intra-operator repeatability and inter-operator reproducibility) by eliminating subjectivity of the clinician.

Automated image segmentation of organs near the pubic bone face certain challenges. Organs such as, for example, a bladder and a prostate, are located in a soft tissue environment wherein resolution against surrounding structures has poor contrast since neighboring organs have similar density values. Additionally, a partial volume effect may distort borders between organs. The partial volume effect occurs because along borders between organs, the Hounsfield Unit values are a weighted average of density values of neighboring volumes. Furthermore, shape and position of organs such as, for example, the prostate may change periodically. Characteristics of abdominal organs also change from patient to patient including for example, shape, size and location of the organ. Imaging parameters of CT machines vary as well.

Methods have been developed to use statistical data gathered from images of numerous patients in order to assist in image reconstruction. However, the use of statistical data in a manner described above requires alignment of the images. Thus, it is desirable to obtain a method to automatically transform CT studies of the pelvis region to a common reference frame.

BRIEF DESCRIPTION OF THE INVENTION

Exemplary embodiments of the invention include a method for automatically transforming computed tomography (CT) studies to a common reference frame. The method includes transforming selected CT studies to the common reference frame and generating a statistical atlas via a registration algorithm including a local refinement and establishing voxel-to-voxel correspondence between a CT study to be segmented and the statistical atlas via the registration algorithm including the local refinement.

Further exemplary embodiments of the invention include a system for automatically transforming CT studies to a common reference frame. The system includes an imaging system and a controller. The imaging system is configured to generate a set of slices comprising image data of an object. The controller is configured to transform selected CT studies to the common reference frame and generate a statistical atlas via a registration algorithm including a local refinement. The controller is also configured to establish voxel-to-voxel correspondence between a CT study to be segmented and the statistical atlas via the registration algorithm including the local refinement.

Still further exemplary embodiments of the invention include a computer program product for automatically segmenting image data of an object within a region of interest. The product includes a storage medium that is readable by a processing circuit. The storage medium stores instructions for execution by the processing circuit. The instructions are for transforming selected CT studies to a common reference frame and generating a statistical atlas via a registration algorithm including a local refinement and establishing voxel-to-voxel correspondence between a CT study to be segmented and the statistical atlas via the registration algorithm including the local refinement.

The above, and other objects, features and advantages of the present invention will become apparent from the following description read in conjunction with the accompanying drawings, in which like reference numerals designate the same elements.

BRIEF DESCRIPTION OF THE DRAWINGS

Referring now to the drawings wherein like elements are numbered alike in the several FIGURES.

DETAILED DESCRIPTION OF THE INVENTION

Although a detailed description of a method and system for automatically transforming computed tomography (CT) studies of a pelvis region to a common reference frame follows, it will be appreciated by one skilled in the art that the method and system that follow are also suitable for other organs, especially organs located in a soft tissue environment near a bone structure.

An embodiment of the invention may be embodied in the form of computer-implemented processes and apparatuses for practicing those processes. The present invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. The technical effect of the executable instructions is to automatically transform CT studies of the pelvis region to a common reference frame.

In model-based segmentation, transforming CT studies to a common reference frame is a useful step before commencing segmentation. Transforming CT studies to a common reference frame is often called "registering" the CT studies. When the CT studies are registered, it is assumed that anatomic regions of different studies are found in approximately a same voxel region. Thus, a probability atlas, or statistical atlas, may be generated that represents a probability that a given voxel is a part of a particular organ. Given the statistical atlas, a new CT study may be registered to determine a transfer function. The inverse of the transfer function may then be applied to transform statistical atlas data to a coordinate system of a CT study to be segmented to help initialize a segmentation algorithm.

Figure 1:
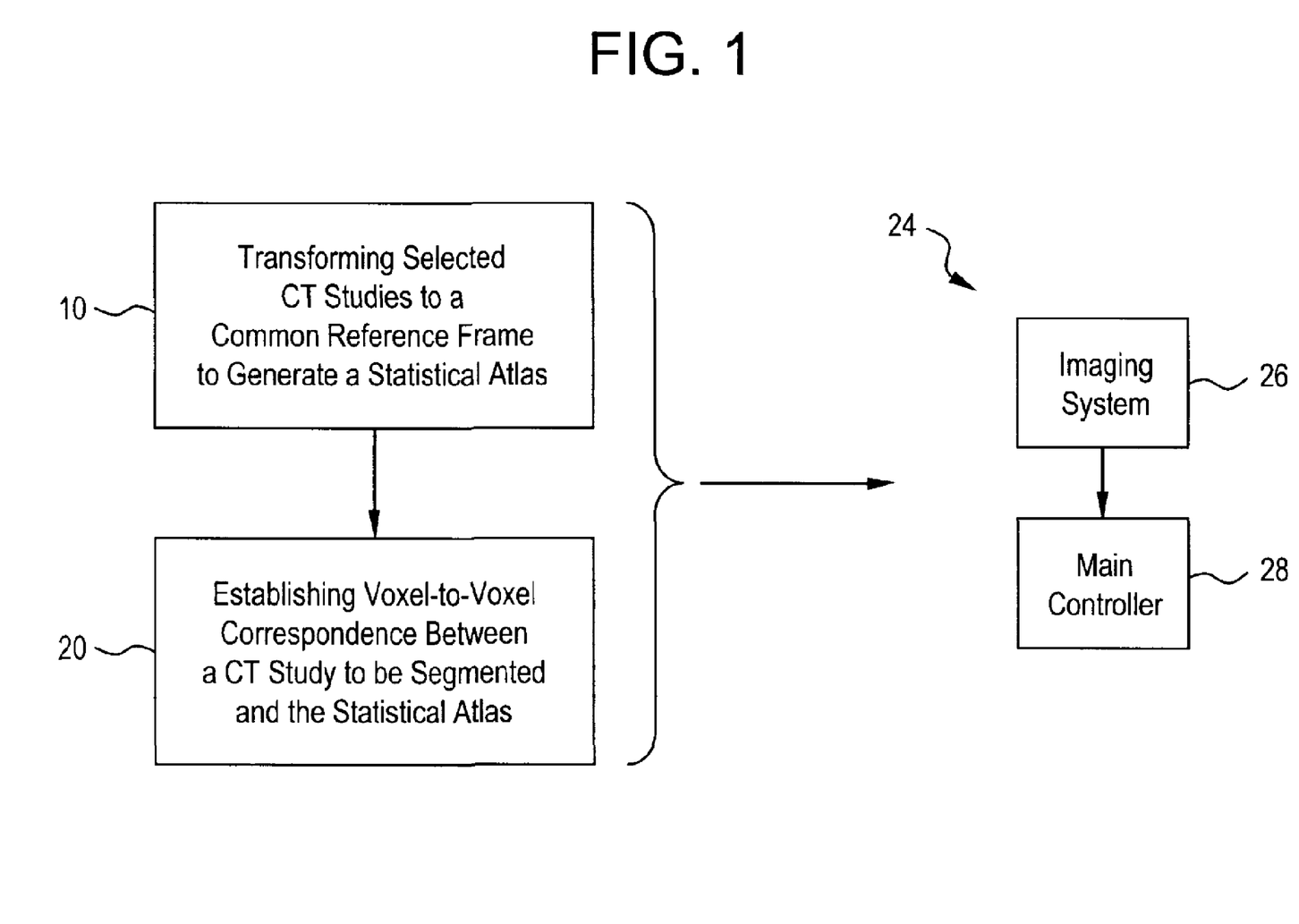
FIG. 1 is a block diagram illustrating a method and system for automatically transforming computed tomography (CT) studies of the pelvis region to a common reference frame according to an exemplary embodiment.

FIG. 1 is a block diagram illustrating a method and system for automatically transforming CT studies of the pelvis region to a common reference frame according to an exemplary embodiment. An organ for which this method is used includes but is not limited to a prostate and a bladder. The method includes transforming selected CT studies to a common reference frame to generate a statistical atlas at block 10, and establishing voxel-to-voxel correspondence between the CT study to be segmented and the statistical atlas at block 20. The method may be performed by a system 24. The system 24 includes an imaging system 26 and a main controller 28. Examples of imaging system 26 include a camera, an X-ray plane film radiography system, a computed tomography (CT) imaging system, a magnetic resonance imaging (MRI) system, and a nuclear medicine imaging system. The imaging system 26 is used to acquire a set of slices of images. Main controller 28 receives the set of slices from the imaging system 26 and executes the automatically transforming CT studies of the pelvis region to a common reference frame. In an exemplary embodiment, the main controller 28 includes the computer described above, which contains the computer program code having instructions for automatically transforming CT studies of the pelvis region to the common reference frame.

Figure 2:
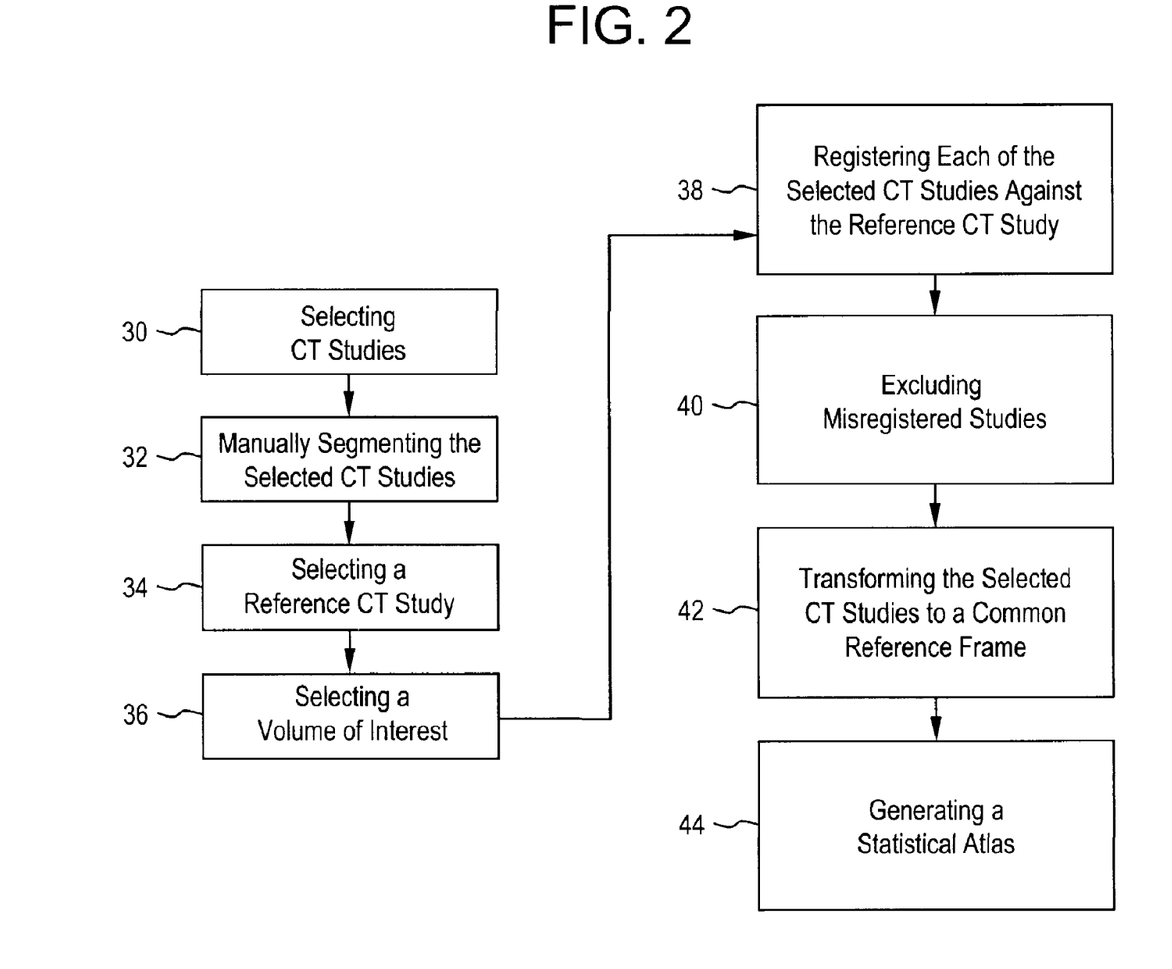
FIG. 2 is a block diagram illustrating in detail transforming selected CT studies to a common reference frame to generate a statistical atlas according to an exemplary embodiment.

FIG. 2 is a block diagram illustrating in detail the transforming reference CT studies to the common reference frame to generate the statistical atlas of block 10. Block 10 includes collecting the selected CT studies at block 30, manually segmenting the selected CT studies at block 32, selecting a reference CT study at block 34, selecting a volume of interest at block 36, registering each of the selected CT studies against the reference CT study at block 38, excluding misregistered studies at block 40, transforming the selected CT studies to the common reference frame at block 42, and generating the statistical atlas at block 44.

Figure 3:
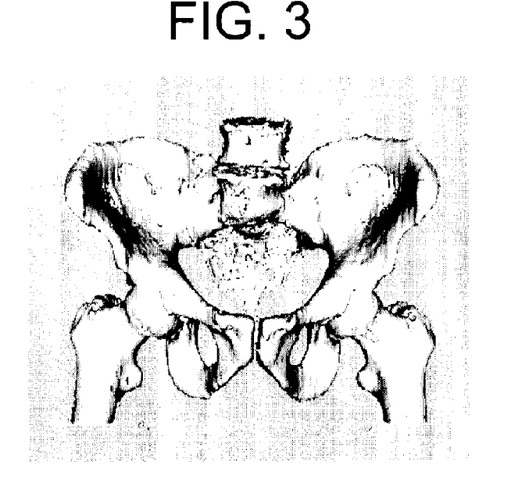
FIG. 3 is an illustration of a bone surface of a suitable reference study.

Selected CT studies collected at block 30 include a number of previously obtained CT studies from various different patients. An expert segments the selected CT studies by hand at block 32. At block 34, the reference CT study is selected. All of the selected CT studies will be registered against the reference CT study. Thus, the reference CT study is selected to have good spatial resolution relative to the selected CT studies and be of good quality. A bone surface of an exemplary reference CT study is shown in FIG. 3. Additionally the reference CT study covers an entire region of the pelvis while exhibiting no artificial objects.

Figure 4:
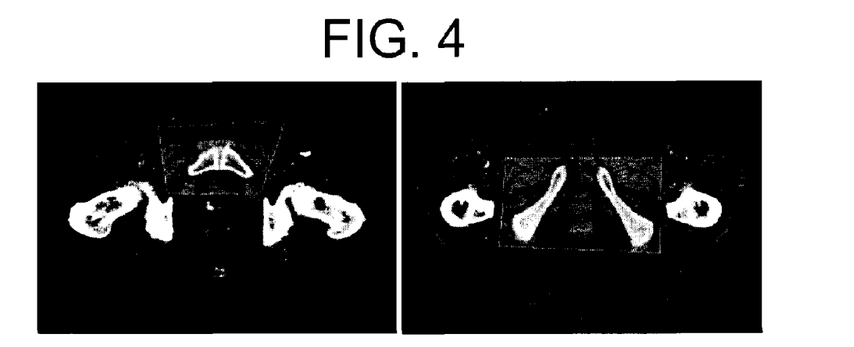
FIG. 4 is an illustration of a manually selected volume of interest of a pubic bone region for local refinement in two transaxial slices.
Figure 5:
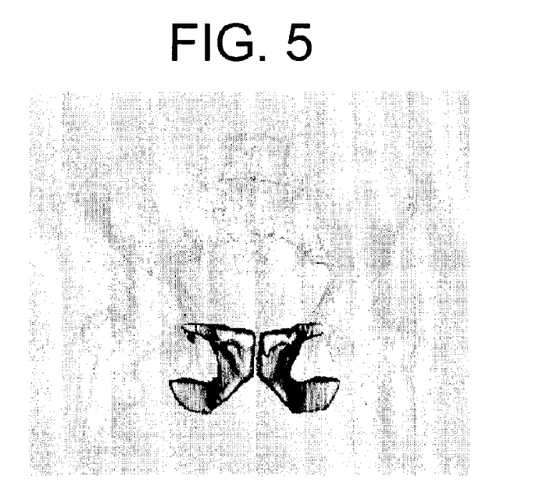
FIG. 5 is an illustration of a surface model of a part of a pubic bone inside the manually selected volume of interest for local refinement.

At block 36, the volume of interest is selected. As shown in FIG. 4, the volume of interest is manually selected in a local neighborhood of a pubic bone in the CT study to be segmented. FIG. 5 shows a surface model of a part of the pubic bone within the volume of interest. The volume of interest is used for a local refinement step in a registration algorithm. In the local refinement step, alignment between organs in the reference CT study and the CT study to be segmented which are disposed within the volume of interest is further refined. The registration algorithm is used to register the selected CT studies against the reference CT study at block 38. In response to a presence of large registration errors in some of the selected CT studies, those CT studies having the large registration errors are excluded from further processing at block 40. Remaining ones of the selected CT studies are transformed to the common reference frame at block 42, and the statistical atlas is generated at block 44 corresponding to organs within the pelvis region.

Figure 6:
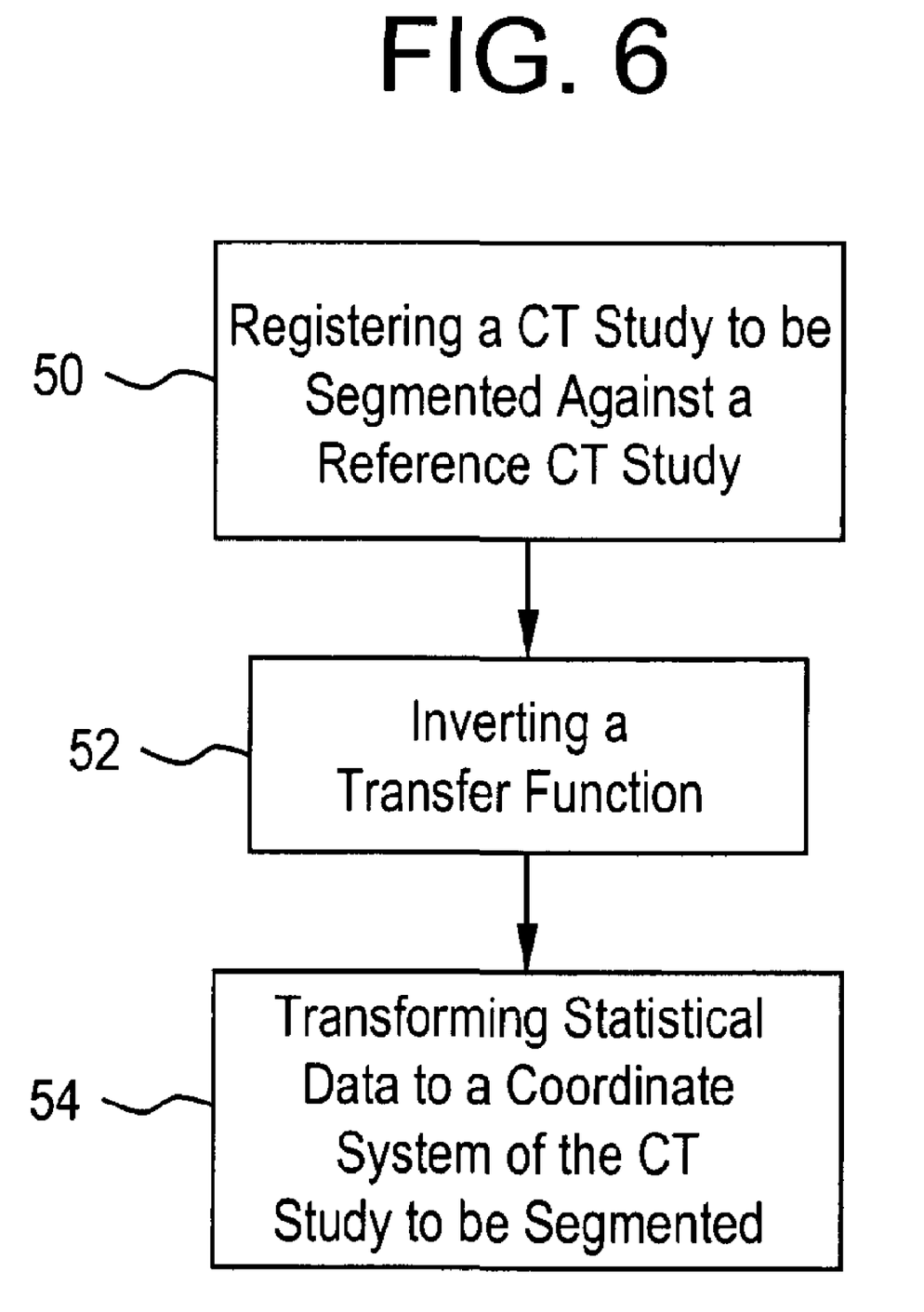
FIG. 6 is a block diagram illustrating in detail establishing voxel-to-voxel correspondence between a CT study to be segmented and a statistical atlas according to an exemplary embodiment.

FIG. 6 is a block diagram illustrating in detail the establishing voxel-to-voxel correspondence between the CT study to be segmented and the statistical atlas at block 20. Block 20 includes registering the CT study to be segmented against the reference CT study at block 50, inverting a transfer function at block 52, and transforming statistical data to a coordinate system of the CT study to be segmented at block 54.

Registration of the CT study to be segmented against the reference study is performed using the registration algorithm including the local refinement step at block 50. During registration of the CT study to be segmented, a transfer function for the registration is determined. The transfer function is then inverted at block 52 to produce an inverse transfer function. The inverse transfer function may be used to establish the voxel-to-voxel correspondence between the common reference frame and the CT study to be segmented. The inverse transfer function is used to transform the statistical data from the common reference frame to a coordinate system of the CT study to be segmented at block 54. Thus, the statistical atlas data can be used to initialize the segmentation algorithm.

A number of registration algorithms currently exist for registering a CT study against the reference CT study. A general registration algorithm may be tailored to use with the method above if characteristics described below are present. An algorithm suitable for use with the method above was proposed by Tanacs and Kuba [A. Tanacs, A. Kuba: "Evaluation of a Fully Automatic Medical Image Registration Algorithm Based on Mutual Information, Acta Cybernetica, vol 16, pp. 327-336, 2003], which is incorporated herein by reference.

Figure 7:
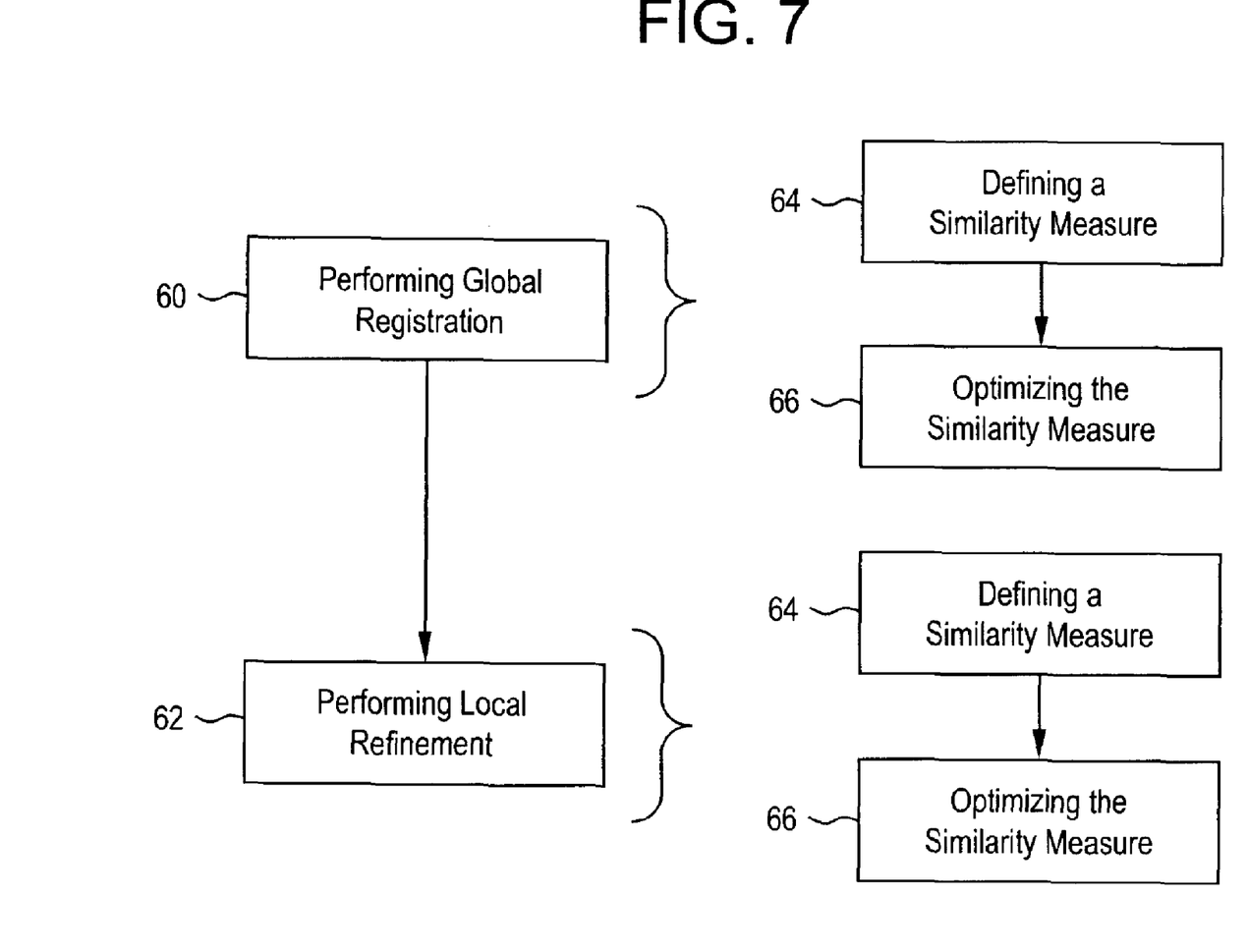
FIG. 7 is a block diagram showing a general registration algorithm for employing the method for automatically transforming CT studies of the pelvis region to the common reference frame according to an exemplary embodiment.

FIG. 7 is a block diagram showing a general registration algorithm for employing the method for automatically transforming CT studies of the pelvis region to the common reference frame according to an exemplary embodiment. The general registration algorithm includes performing global registration at block 60 and performing local refinement at block 62. Both blocks 60 and 62 include determining a similarity measure at block 64, and optimizing the similarity measure at block 66.

Performing global registration includes a geometric transformation to roughly align anatomic structures from separate images so that the anatomic structures are "close" to each other. The geometric transformation includes three rotations around axes, three translations along axes, and three scale parameters along the axes.

Figure 8:
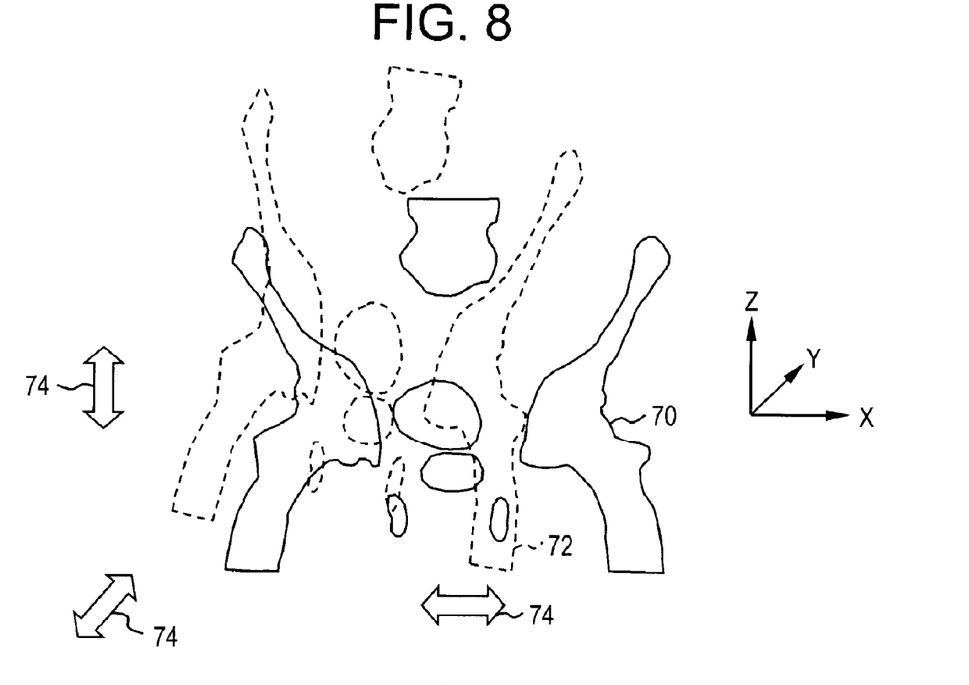
FIG. 8 shows a translation along axes according to an exemplary embodiment.

FIG. 8 shows a translation along axes according to an exemplary embodiment. The solid outline represents the reference CT study 70 and the dashed outline represents a CT study to be registered 72. Arrows 74 indicate a direction of translation about an x-axis, a y-axis, and a z-axis. Results of an optimal translation are shown in FIG. 9.

Figure 9:
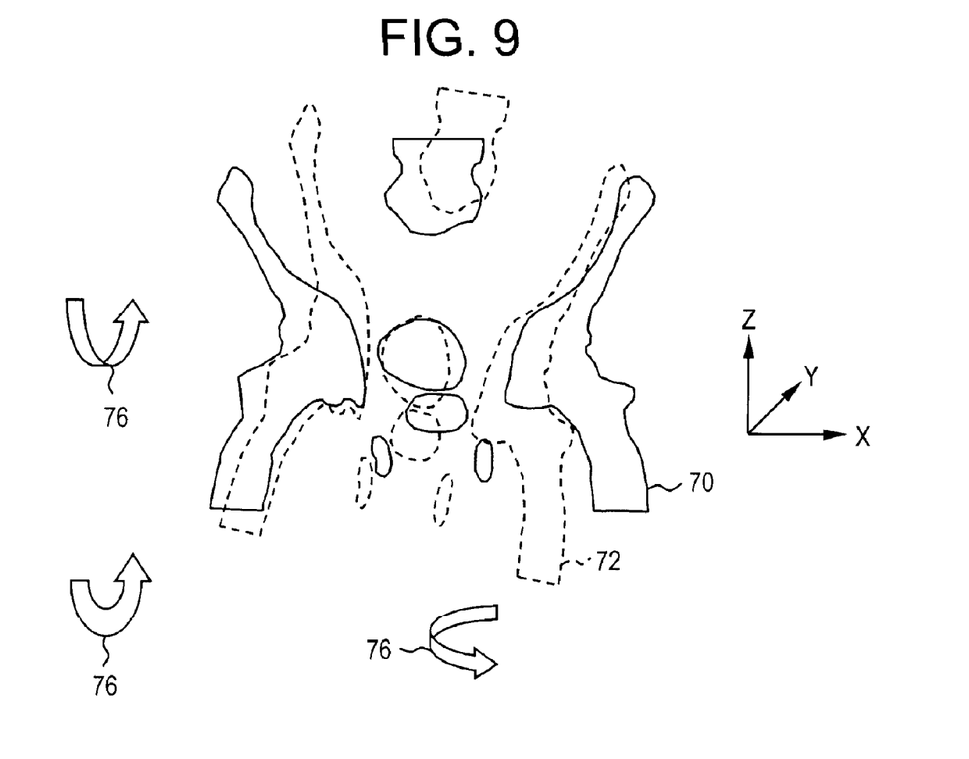
FIG. 9 shows a rotation around axes according to an exemplary embodiment.

FIG. 9 shows a rotation around axes according to an exemplary embodiment. The CT study to be registered 72 is rotated about the x-axis, y-axis, and z-axis as shown by arrows 76 to align the CT study to be registered 72 with the reference CT study 70. Results of an optimal rotation are shown in FIG. 10.

Figure 10:
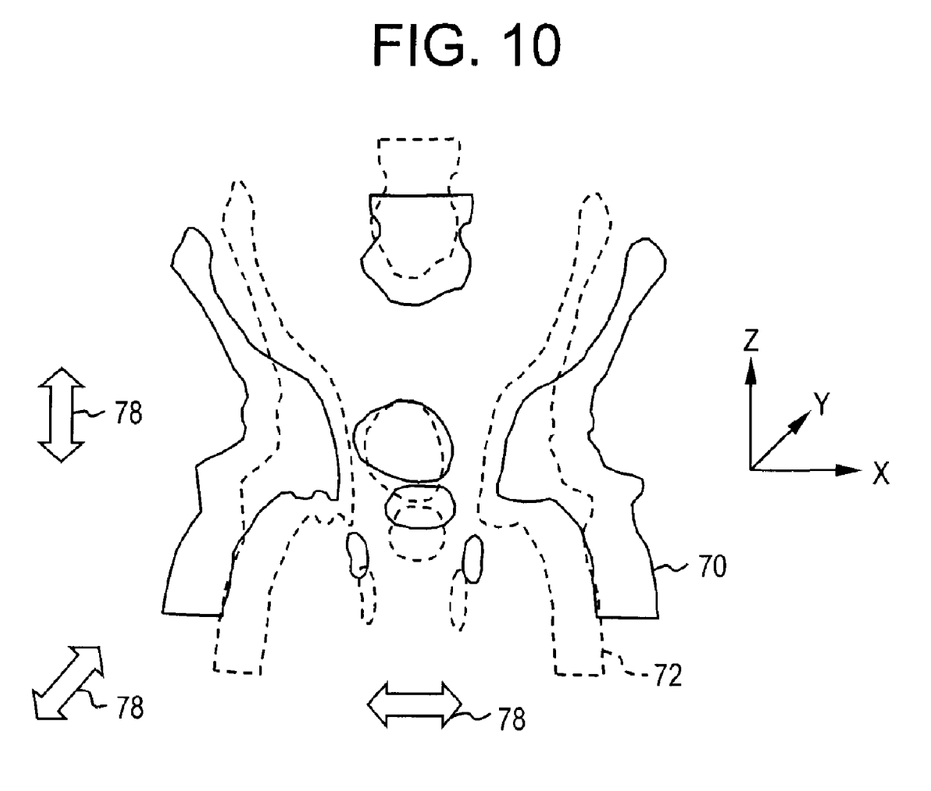
FIG. 10 shows a scaling along axes according to an exemplary embodiment.
Figure 11:
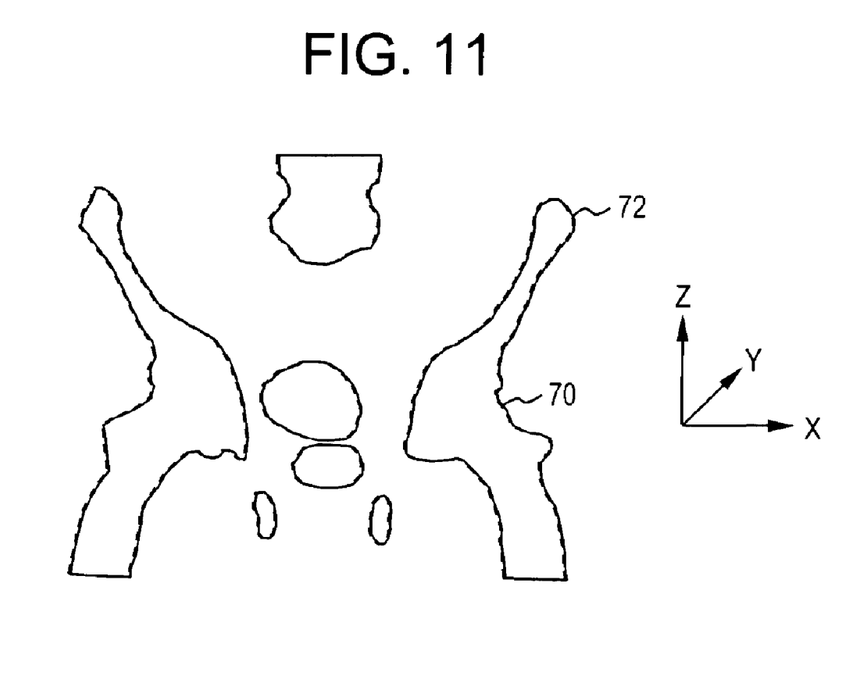
FIG. 11 is an illustration of a theoretical result of performing global registration.

FIG. 10 shows a scaling along axes according to an exemplary embodiment. The CT study to be registered 72 is scaled along the x-axis, y-axis, and z-axis as shown by arrows 78 to align the CT study to be registered 72 with the reference CT study 70. Results of an optimal translation, rotation and scaling are shown in FIG. 11. FIG. 11 shows a theoretical view of a final result following the performing the global registration at block 60.

Figure 12:
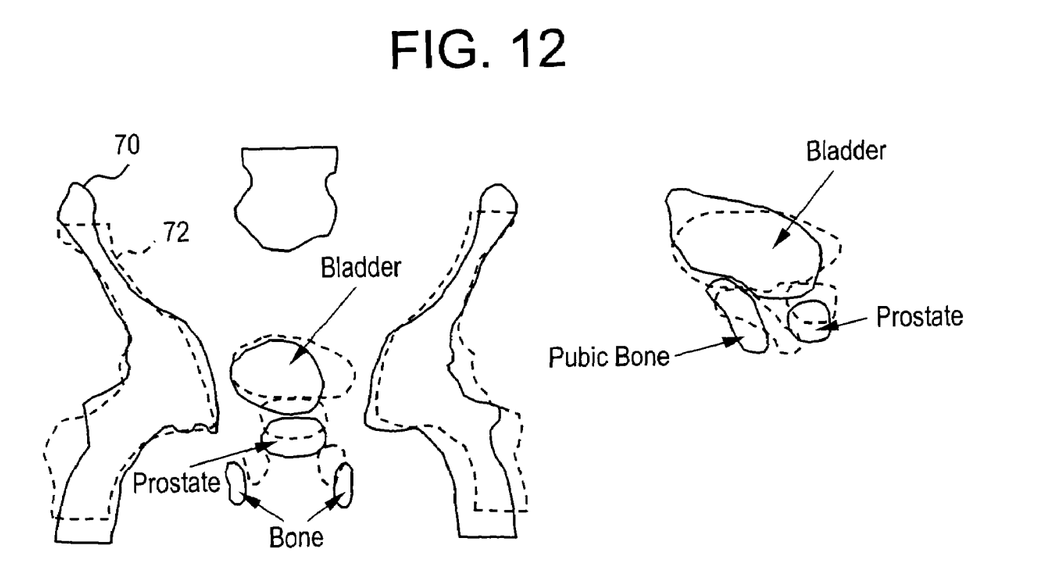
FIG. 12 is an illustration of an actual result following performing global registration.
Figure 13:
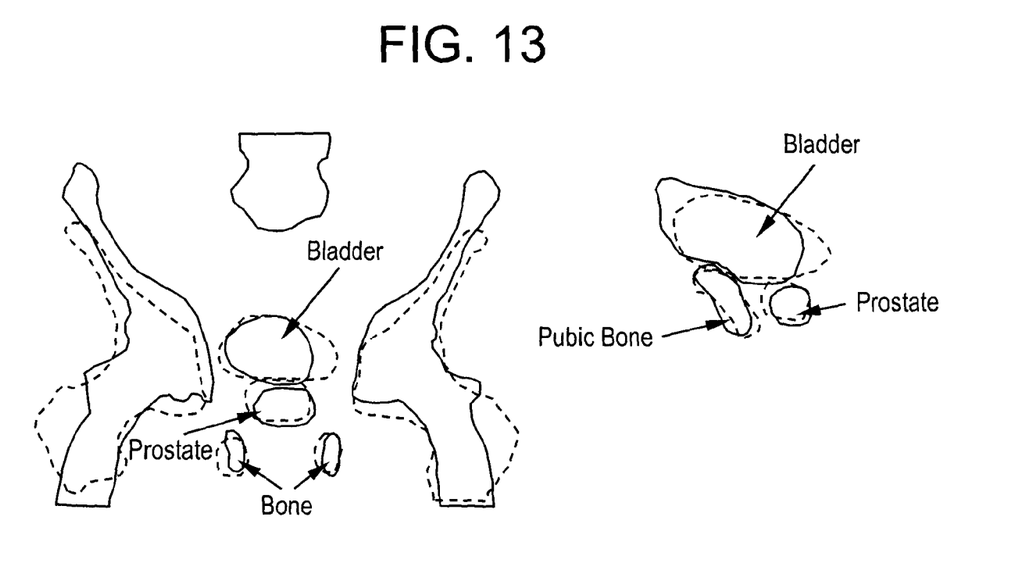
FIG. 13 is an illustration of an actual result following performing local refinement on an image of FIG. 12.

Unfortunately, due to inherent anatomic differences between patients, a certain amount of misalignment still exists after the global registration. The global registration is performed using only bone structures for alignment, and thus is limited in ability to produce alignment. FIG. 12 is derived from actual data and shows a misalignment between the CT study to be registered 72 with the reference CT study 70. Performing the local refinement is used to refine alignment of the anatomic structures in the volume of interest. The local refinement involves further optimization of six rigid-body parameters using intensity information from the volume of interest. The local refinement may use both bone structures and soft tissue for alignment. Thus, the local refinement produces an improved alignment over a case where only global registration is performed as shown in FIG. 13.

The similarity measure calculates how similar each voxel of the reference CT study is to each corresponding voxel of the CT study to be segmented. Thus, the similarity measure evaluates a fit between two CT studies. The similarity measure may be calculated from, for example, a sum of squared differences, a cross correlation, or metrics based on information theory such as mutual information or normalized mutual information. In an exemplary embodiment, utilizing normalized mutual information is selected to produce stable results.

Optimizing the similarity measure includes an iterative process of general nonlinear optimization method. Parameters are initialized, and then the general nonlinear optimization method obtains an optimum similarity measure by systematically changing the parameters.

The general registration algorithm described above provides for fully automatic registration of the CT study to be segmented. Additionally, the general registration algorithm may be scaled to decrease execution time or to increase precision as required by each application. A hierarchical approach to use of the local refinement is possible in order to control an execution time of the general registration algorithm. The hierarchical approach gradually decreases a size of image data ensuring that voxel values of original data equally contribute in each smaller data set.

Although bone structure has been used above to drive global registration, it should be noted that both bone and soft tissue parts may be used.

In addition, while the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for automatically transforming computed tomography (CT) studies to a common reference frame, the method comprising:
   transforming selected CT studies to the common reference frame and generating a statistical atlas via a registration algorithm including a local refinement; and
   establishing voxel-to-voxel correspondence between a CT study to be segmented and the statistical atlas via the registration algorithm including the local refinement.

2. The method of claim 1, wherein the transforming selected CT studies to the common reference frame to generate the statistical atlas comprises:
   selecting the CT studies;
   manually segmenting the selected CT studies;
   selecting a reference CT study;
   selecting a volume of interest;
   registering each of the selected CT studies against the reference CT study;
   excluding misregistered studies;
   transforming remaining selected CT studies to the common reference frame; and
   generating the statistical atlas.

3. The method of claim 2, wherein the selecting the reference CT study includes selecting one of the selected CT studies having:
   quality and spatial resolution of a selected level relative to others of the selected CT studies; and
   coverage of an entire region of the pelvis with no artificial objects in the entire region of the pelvis.

4. The method of claim 2, wherein the selecting the volume of interest comprises manually selecting a local neighborhood of a pubic bone.

5. The method of claim 2, wherein the excluding misregistered studies comprises:
   identifying ones of the selected CT studies having large registration errors; and
   excluding the ones of the selected CT studies having the large registration errors from further processing.

6. The method of claim 1, wherein the establishing voxel-to-voxel correspondence between the CT study to be segmented and the statistical atlas comprises:
   registering the CT study to be segmented against the reference CT study;
   inverting a transfer function which registered the CT study to be segmented; and
   transforming statistical data from the common reference frame to a coordinate system of the CT study to be segmented using the inverted transfer function.

7. The method of claim 1. wherein the registration algorithm comprises:
   performing global registration; and
   performing the local refinement,
   wherein both the performing global registration and the performing the local refinement include:
   determining a similarity measure; and
   optimizing the similarity measure such that a fit between the CT study to be segmented and a reference CT study is maximized.

8. The method of claim 7, wherein the performing global registration comprises aligning bony structures between the CT study to be segmented and the reference CT study.

9. The method of claim 7, wherein the performing local refinement comprises aligning bony structures and soft tissue structures between the CT study to be segmented and the reference CT study in a volume of interest.

10. The method of claim 7, wherein the performing global registration comprises:
    rotating an image around each of an x-axis, a y-axis that is substantially perpendicular to the x-axis, and a z-axis that is substantially perpendicular to an x-y plane;
    translating the image along each of the x-axis, the y-axis, and the z-axis; and
    scaling parameters of the image along each of the x-axis, the y-axis, and the z-axis.

11. The method of claim 7, wherein the performing the local refinement comprises aligning rigid-body parameters using intensity information from a volume of interest.

12. The method of claim 7, wherein the determining the similarity measure comprises evaluating a fit between the CT study to be segmented and the reference CT study by performing at least one of:
    calculating a sum of squared differences;
    calculating a cross correlation;
    calculating metrics based on mutual information; and
    calculating metrics based on normalized mutual information.

13. The method of claim 12, wherein the optimizing the similarity measure comprises:
    initializing parameters; and
    employing a general nonlinear optimization method to systematically change the parameters to obtain an optimum similarity measure.

14. A system for automatically transforming computed tomography (CT) studies to a common reference frame, the system comprising:
    an imaging system configured to generate a set of slices comprising image data of an object; and
    a controller configured to:
    transform selected CT studies to the common reference frame to generate a statistical atlas via a registration algorithm including a local refinement; and
    establish voxel-to-voxel correspondence between a CT study to be segmented and the statistical atlas via the registration algorithm including the local refinement.

15. The system of claim 14, wherein the registration algorithm further comprises a global registration, and wherein both the global registration and the local refinement include:
    a similarity measure; and
    an optimization of the similarity measure such that a fit between the CT study to be segmented and a reference CT study is maximized.

16. The system of claim 15, wherein the optimization of the similarity measure comprises evaluation of the fit between the CT study to be segmented and the reference CT study using at least one of:
    a sum of squared differences;
    a cross correlation;
    metrics based on mutual information; and
    metrics based on normalized mutual information.

17. A computer program storage medium readable by a processing circuit, storing instructions for execution by the processing circuit for automatically segmenting image data of an object within a region of interest, and for storing instructions for execution by the processing circuit for:
    transforming selected computed tomography (CT) studies to a common reference frame to generate a statistical atlas via a registration algorithm including a local refinement; and
    establishing voxel-to-voxel correspondence between a CT study to be segmented and the statistical atlas via the registration algorithm including the local refinement.

18. The computer program storage medium of claim 17, wherein the storage medium stores further instructions for:
  selecting the CT studies;
  manually segmenting the selected CT studies;
  selecting a reference CT study;
  selecting a volume of interest;
  registering each of the selected CT studies against the reference CT study;
  excluding misregistered studies;
  transforming remaining selected CT studies to the common reference frame; and
  generating the statistical atlas.

19. The computer program storage medium of claim 17, wherein the storage medium stores further instructions for:
  registering the CT study to be segmented against the reference CT study;
  inverting a transfer function which registered the CT study to be segmented; and
  transforming statistical data from the common reference frame to a coordinate.

20. The computer program storage medium of claim 17, wherein the registration algorithm comprises:
  performing global registration; and
  performing the local refinement,
  wherein both the performing global registration and the performing the local refinement include:
  determining a similarity measure; and
  optimizing the similarity measure such that a fit between the CT study to be segmented and a reference CT study is maximized.

21. The computer program storage medium of claim 20, wherein the performing global registration comprises aligning bony structures between the CT study to be segmented and the reference CT study.

22. The computer program storage medium of claim 20, wherein the performing local refinement comprises aligning bony structures and soft tissue structures between the CT study to be segmented and the reference CT study in a volume of interest.

23. The computer program storage medium of claim 17, wherein the performing the local refinement comprises aligning rigid-body parameters using intensity information from a volume of interest.

* * * * *